United States Patent
Thompson et al.

(10) Patent No.: US 9,229,548 B2
(45) Date of Patent: Jan. 5, 2016

(54) RECONFIGURABLE OBJECTS FOR TOUCH PANEL INTERACTION

(71) Applicant: Goldilocks Consulting, LLC, Santa Cruz, CA (US)

(72) Inventors: Laura Thompson, Santa Cruz, CA (US); Joe Keating, Broomfield, CO (US); Bradley Cohen, Evans, CO (US); Frank D Roberts, II, Littleton, CO (US); Ryan C Minnig, Englewood, CO (US)

(73) Assignee: Goldilocks Consulting, LLC, Santa Cruz, CA (US)

(*) Notice: Subject to any disclaimer, the term of this patent is extended or adjusted under 35 U.S.C. 154(b) by 13 days.

(21) Appl. No.: 14/213,598

(22) Filed: Mar. 14, 2014

(65) Prior Publication Data

US 2014/0267118 A1   Sep. 18, 2014

Related U.S. Application Data

(60) Provisional application No. 61/784,962, filed on Mar. 14, 2013.

(51) Int. Cl.
| | |
|---|---|
| *G06F 3/041* | (2006.01) |
| *G06F 3/039* | (2013.01) |
| *G06F 3/0354* | (2013.01) |
| *G06F 3/0488* | (2013.01) |
| *G06F 3/0362* | (2013.01) |
| *G06F 3/038* | (2013.01) |

(52) U.S. Cl.
CPC .............. *G06F 3/039* (2013.01); *G06F 3/038* (2013.01); *G06F 3/0362* (2013.01); *G06F 3/03543* (2013.01); *G06F 3/03549* (2013.01); *G06F 3/0488* (2013.01)

(58) Field of Classification Search
None
See application file for complete search history.

(56) References Cited

U.S. PATENT DOCUMENTS

| | | |
|---|---|---|
| 4,263,504 A | 4/1981 | Thomas |
| 6,643,388 B1 | 11/2003 | Yoo |
| 7,118,482 B2 | 10/2006 | Ishihara et al. |
| 7,683,888 B1 | 3/2010 | Kennedy |
| 7,967,217 B2 | 6/2011 | Yoshida |

(Continued)

OTHER PUBLICATIONS

Fisher-Price's Apptivity toys turn iPads into immersive playsets; Jan. 8, 2013.

(Continued)

*Primary Examiner* — Muhammad N Edun
(74) *Attorney, Agent, or Firm* — Duft Bornsen & Fettig, LLP

(57) ABSTRACT

Systems disclosed herein provide objects that are capable of altering a configuration of touch points in contact with a surface of a touch-sensitive system. In one embodiment, an object includes an outer member, an intermediate member, and an inner member. The outer member has an opening between a top surface and a bottom surface. The intermediate member has an opening between a top surface and a bottom surface, where the intermediate member fits within the opening of the outer member. The inner member fits within the opening of the intermediate member and has a bottom surface. The bottom surface of each of the members includes a touch point. A contact with the surface for each touch point is coplanar when the members are fit together. Further, the configuration of touch points in contact with the surface defines an identifier for the object to the touch-sensitive system.

18 Claims, 9 Drawing Sheets

(56) References Cited

U.S. PATENT DOCUMENTS

| | | | |
|---|---|---|---|
| 8,330,629 B2* | 12/2012 | Shimizu et al. | 345/156 |
| 2008/0055241 A1* | 3/2008 | Goldenberg et al. | 345/156 |
| 2010/0302171 A1 | 12/2010 | Yoshida | |
| 2011/0074710 A1 | 3/2011 | Weeldreyer et al. | |
| 2011/0300831 A1 | 12/2011 | Chin | |
| 2011/0305875 A1* | 12/2011 | Sanford et al. | 428/174 |
| 2012/0062490 A1 | 3/2012 | Heatherly et al. | |
| 2012/0249430 A1 | 10/2012 | Oster et al. | |

OTHER PUBLICATIONS

Fisher-Price's new Apptivity toys move play further into technology; Mar. 4, 2014.

* cited by examiner

RECONFIGURABLE OBJECTS FOR TOUCH PANEL INTERACTION

CROSS REFERENCE TO RELATED APPLICATIONS

This document claims priority to, and thus the benefit of an earlier filing date from, U.S. Provisional Patent Application No. 61/784,962 (filed Mar. 14, 2013) entitled "USER-CONFIGURABLE PAWN FOR TOUCH PANEL INTERACTION", which is hereby incorporated by reference.

FIELD OF THE INVENTION

The invention relates to the field of touch-sensitive systems, and in particular, to objects that interact with the surface of a touch-sensitive system utilizing touch points.

BACKGROUND

Touch-sensitive systems utilize specialized surfaces to allow a user to interact with the system using touches. For example, a tablet computer display may include a touch surface to allow the user to interact and control the tablet. Touch surfaces may be implemented by measuring resistance changes in the surface when the surface is touched, by measuring capacitance changes in the surface when touched, by measuring acoustical changes in the surface when touched, etc. One type of touch surface is a multi-touch surface. A multi-touch surface is capable of resolving multiple points of contact with the surface at once. For instance, a user of a multi-touch device may use two fingers to rotate a display, to zoom in on a portion of the display, etc.

When an object that includes multiple touch points is placed on a multi-touch-capable surface, the touch-sensitive system is able to resolve the touch points to identify the object. This allows a user to utilize a touch-sensitive system for game play. For instance, a user may place a number of game pieces onto a surface of a touch-sensitive system, and the touch-sensitive system is capable of identifying the pieces for interactive game play. Typically, the game pieces will include a number of touch points that contact with the surface in a particular configuration that is unique. However, the game pieces are often mass-produced, which may result in duplicate configurations of touch points across a variety of different game pieces. In this case, a touch-sensitive system may be easily confused when configurations between different game pieces are duplicated.

SUMMARY

Systems disclosed herein provide passive objects capable of changing a configuration of touch points in contact with a surface of a touch-sensitive system. In these embodiments, the objects include touch points that are re-configurable. Therefore, the objects are not tied to a particular configuration of touch points. Other systems are disclosed that provide active objects that are capable of providing electronic identification information to a touch-sensitive system using electrical signals applied to touch points.

In one embodiment, an object is disclosed that is capable of altering a configuration of touch points in contact with a surface of a touch-sensitive system. The object includes an outer member, an intermediate member, and an inner member. The outer member has an opening between a top surface and a bottom surface. The intermediate member has an opening between a top surface and a bottom surface, where the intermediate member fits within the opening of the outer member. The inner member fits within the opening of the intermediate member. The bottom surface of each of the outer member, the intermediate member, and the inner member includes a touch point. A contact point with the surface for each touch point is coplanar when the outer member, the intermediate member, and the inner member are fit together. Further, the configuration of touch points in contact with the surface defines an identifier for the object to the touch-sensitive system.

In another embodiment, an object is disclosed that is capable of altering a configuration of touch points in contact with a surface of a touch-sensitive system. The object includes a spindle, an outer disk, an intermediate disk, and an inner disk. The outer disk is fixed to an end of the spindle and has a top surface facing the spindle and a bottom surface. The intermediate disk is rotatably coupled to the end of the spindle and has a top surface and a bottom surface. The top surface of the intermediate disk is proximate to the bottom surface of the outer disk. Further, a radius of the intermediate disk is less than a radius of the outer disk. The inner disk is rotatably coupled to the end of the spindle and has a top surface and a bottom surface. The top surface of the inner disk is proximate to the bottom surface of the intermediate disk. Further, a radius of the inner disk is less than the radius of the intermediate disk. The bottom surface of each of the outer disk, the intermediate disk, and the inner disk includes a touch point. Further, a contact point with the surface for each touch point defines an identifier for the object to the touch-sensitive system.

In another embodiment, an object is disclosed that is configured to contact a surface of a touch-sensitive system. The object comprises a first touch point that is configured to contact the surface, and a second touch point that is configured to contact the surface. The first touch point and the second touch point define a vector of orientation of the object. The object further includes a controller that is configured to generate a first electrical signal at the first touch point, and to generate a second electrical signal at the second touch point, where the first electrical signal and the second electrical signal allow the touch-sensitive system to identify the vector of orientation of the object. The controller is further configured to transmit an identifier for the object to the touch-sensitive system utilizing at least one of the first electrical signal and the second electrical signal.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION OF THE EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
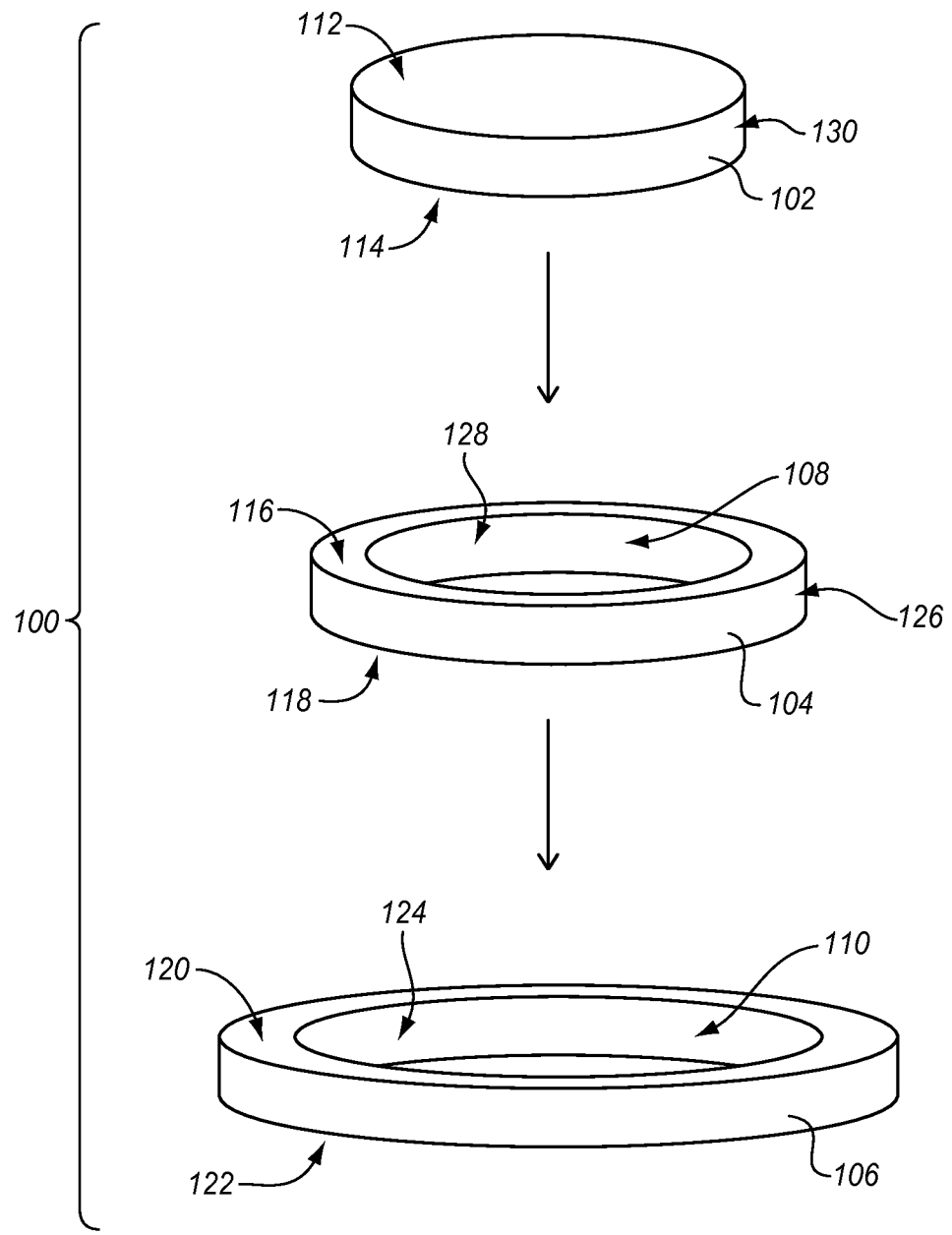
FIG. 1 illustrates a side view of a passive object that is capable of altering a configuration of touch points in contact with a surface of a touch-sensitive in an exemplary embodiment.

FIG. 1 illustrates a side view of a passive object 100 that is capable of altering a configuration of touch points in contact with a surface of a touch-sensitive system in an exemplary embodiment. In this embodiment, passive object 100 may be re-configured to alter the configuration of touch points (not shown in this view) that contact a surface. When a touch-sensitive system is presented with different configurations of touch points for passive object 100, the touch-sensitive system may use the different configurations to assign different identifiers to passive object 100. For example, in a game system, passive object 100 may be used to represent different game pieces by presenting different identifiers to the touch-sensitive system.

In this embodiment, passive object 100 includes different elements that not only fit together, but also may be rotated with respect to each other to present different configurations of touch points to the touch-sensitive system. In particular, passive object 100 in this embodiment includes an inner member 102 that fits within an opening 108 of an intermediate member 104. Further, intermediate member 104 fits within an opening 110 of an outer member 106. Although each of inner member 102, intermediate member 104, and outer member 106 are illustrated in FIG. 1 as circular objects, other configurations exist and therefore, the particular configuration illustrated in FIG. 1 is not intended to limit passive object 100 to any one particular configuration.

In this embodiment, inner member 102 has a top surface 112 and also has a bottom surface 114 that includes at least one touch point. As described herein, a touch point comprises any component that is able to register a touch to a surface of a touch-sensitive system. For instance, in a resistive-grid surface, a touch point is capable of modifying the grid such that a touch-sensitive system is able to determine a location of the touch point on the surface. In the case of a capacitance-based surface, a touch point is capable of modifying a capacitance of the surface such that a touch-sensitive system is able to determine a location of the touch point on the surface.

Referring again to FIG. 1, intermediate member 104 has a top surface 116 and also has a bottom surface 118 that includes at least one touch point. In this embodiment, intermediate member 104 has opening 108 that passes from top surface 116 to bottom surface 118, although other configurations may exist. Outer member 106 has a top surface 120 and also has a bottom surface 122 that includes at least one touch point. In this embodiment, opening 110 of outer member 106 passes from top surface 120 to bottom surface 122, although other configurations may exist.

When passive object 100 is fit together, a contact point for the touch points is coplanar with a surface, such as a surface of the touch-sensitive system. To do so, bottom surface 114 of inner member 102, bottom surface 118 of intermediate member 104, and bottom surface 122 of outer member 106 may lie in the same horizontal plane.

In this embodiment, the configuration of touch points for passive object 100 may be changed by altering the relationship between one or more of inner member 102, intermediate member 104, and outer member 106. This may be more easily recognized in FIG. 2, which illustrates a bottom view of passive object 100 of FIG. 1 when object 100 is fit together in an exemplary embodiment.

Figure 2:
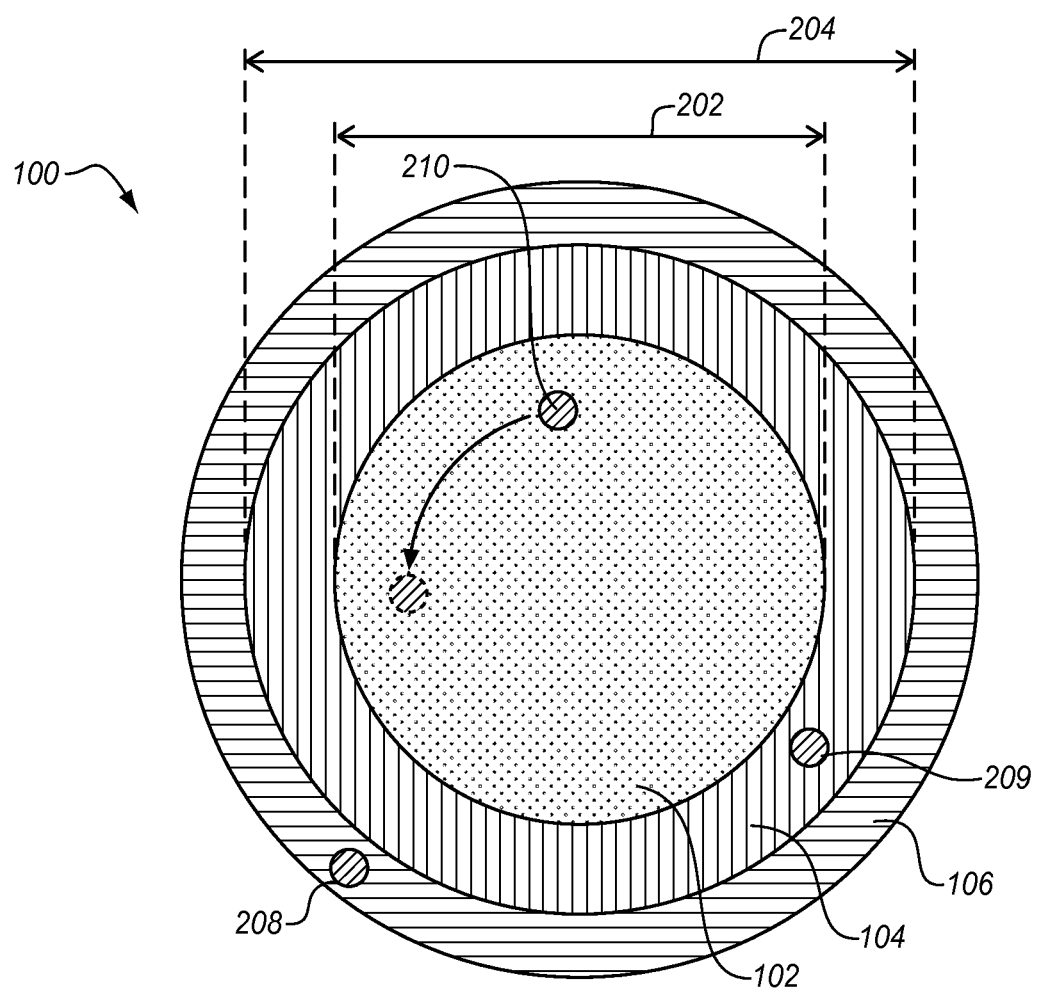
FIG. 2 illustrates a bottom view of the object of FIG. 1 in an exemplary embodiment.

FIG. 2 illustrates that inner member 102 has an outer dimension 202 that is approximate to opening 108 of intermediate member 104, and that an outer dimension 204 of intermediate member 104 is approximate to opening 110 of outer member 106. This allows inner member 102, intermediate member 104, and outer member 106 to fit together.

FIG. 2 further illustrates that inner member 102 includes a touch point 210 on bottom surface 114, intermediate member 104 includes a touch point 209 on bottom surface 118, and outer member 106 includes a touch point 208 on bottom surface 122. Generally, the spatial relationship between touch points 208-210 may be changed as elements are rotated with respect to each other. For instance, if inner member 102 is rotated counter-clockwise with respect to intermediate member 104 as indicated by the arrow, the configuration of touch points 208-210 changes. This allows the touch-sensitive system to identify passive object 100 differently depending on how the configuration of touch points 208-210 change.

Referring again to FIG. 1, outer member 106 is illustrated with an inside surface 124 that is smooth, and intermediate member 104 is illustrated with an outside surface 126 that is smooth. This allows intermediate member 104 to fit within opening 110 of outer member 106, although in some embodiments inside surface 124 and/or outside surface 126 may include features that lock intermediate member 104 and outer member 106 from rotating with respect to each other when intermediate member 104 and outer member 106 are fit together. For instance, inside surface 124 and/or outside surface 126 may include grooves, notches, bevels, slots, etc., which prevent intermediate member 104 from rotating with respect to outer member 106 when intermediate member 104 and outer member 106 are fit together.

In like manner, intermediate member 104 is illustrated with an inside surface 128 that is smooth, and inner member 102 is illustrated with an outside surface 130 that is smooth. This allows inner member 102 to fit within opening 108 of intermediate member 104, although in some embodiments inside surface 128 and/or outside surface 130 may include features that lock inner member 102 and intermediate member 104 from rotating with respect to each other when inner member 102 and intermediate member 104 are fit together. For instance, inside surface 128 and/or outside surface 130 may include grooves, notches, bevels, slots, etc., which prevent inner member 102 from rotating with respect to intermediate member 104 when inner member 102 and intermediate member 104 are fit together.

As discussed previously, one problem with mass-produced objects used to interact with touch-sensitive systems (e.g., game pieces), is that the configuration of touch points used in the game pieces are pre-determined and fixed by the manufacturer prior to production. In some cases, similar or the same game pieces from different manufacturers may have the same configuration of touch points, which may lead to confusion and unintended consequences when the game pieces are mixed together during game play. Other problems may arise when the same type of game piece is used multiple times on the same surface and the game piece has the same configuration of touch points. In this case the touch-sensitive system is unable to uniquely identify each copy because each of them uses the same configuration of touch points.

Using passive object 100, such problems are eliminated by allowing the user to re-configure touch points 208-210 to ensure that each instance of passive object 100 during game play may be uniquely identified by a touch-sensitive system. In cases where the same configuration of touch points 208-210 is used between different passive objects 100, the user may simply be instructed by the touch-sensitive system to reconfigure one of the passive objects 100 into a different configuration of touch points 208-210.

In addition, passive object 100 may simply be a base element for a game figure that may be attached to passive object 100 at some later time. For instance, inner member 102 may include a slot, a magnet, a latch, or some other feature that allows a separate game figure to be attached to passive object 100. This allows passive object 100 to be a generic base element that may be used in a wide variety of interact games. For instance, passive object 100 may be used as a base element for a fantasy role playing game, accepting a wide variety of game figures that may be used for interactive play on a touch-sensitive system. In this instance, users may create new game figures for use with passive object 100, and train or otherwise instruct the touch-sensitive system of the identity of the game figures by configuring or re-configuring the spatial relationships of touch points 208-210 at will.

Figure 3:
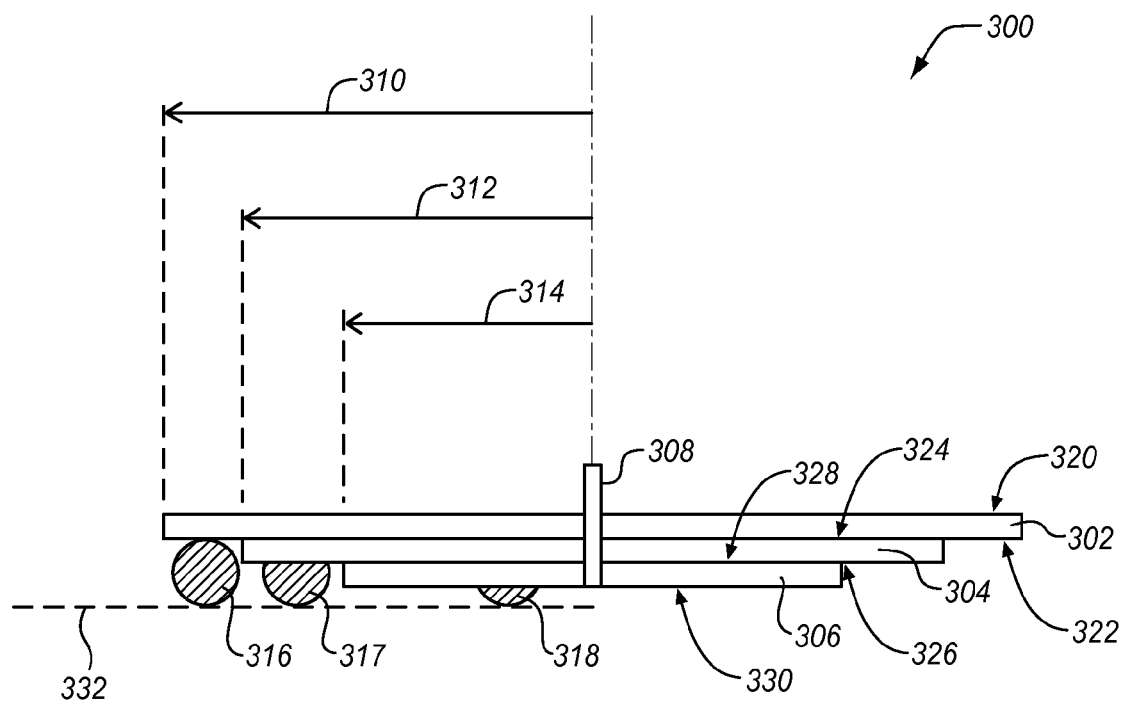
FIG. 3 illustrates a side view of a passive object that is capable of altering a configuration of touch points in contact with a surface of a touch-sensitive system in another exemplary embodiment.

Although passive object 100 is just one embodiment of a device that allows for the configuration of touch points to be re-configured, other embodiments exist. FIG. 3 illustrates a side view of a passive object 300 that is capable of altering a configuration of touch points in contact with a surface of a touch-sensitive system in another exemplary embodiment. In this embodiment, passive object 300 includes a number of disks which may be rotated with respect to each other to vary a configuration of touch points in contact with a surface of a touch-sensitive system. In this embodiment, three disks are illustrated with one touch point for each, although more or fewer disks and/or touch points may be used as a matter of design choice. In particular, passive object 300 in this embodiment includes a spindle 308 with an outer disk 302 attached to an end of spindle 308. In this embodiment, outer disk 302 is fixed and does not rotate with respect to spindle 308 to allow a touch-sensitive system to identify an orientation of passive object 300. Passive object 300 further includes an intermediate disk 304 proximate to outer disk 302, and an inner disk 306 proximate to intermediate disk 304. In this embodiment, both intermediate disk 304 and inner disk 306 rotate with respect to each other and to spindle 308, although other configurations may exist where no disks are fixed to spindle 308. Further, in some embodiments, inner disk 306 may be fixed while outer disk 302 and intermediate disk 304 rotate, and/or intermediate disk 304 may be fixed while outer disk 302 and inner disk 306 rotate.

In this embodiment, outer disk 302 includes a top surface 320 that faces a major portion of spindle 308 and a bottom surface 322 that faces intermediate disk 304. Intermediate disk 304 includes a top surface 324 that faces outer disk 302 and a bottom surface 326 that faces inner disk 306. Inner disk 306 includes a top surface 328 that faces intermediate disk 304 and a bottom surface 330.

In this embodiment, each of outer disk 302, intermediate disk 304, and inner disk 306 have different radii to expose portions of their respective bottom surfaces. Inner disk 306 has a radius 314, which is less than a radius 312 of intermediate disk 304. In like manner, radius 312 of intermediate disk 304 is less than a radius 310 of outer disk 302. This allows touch points 316-318 to be located along the respective bottom surfaces of outer disk 302, intermediate disk 304, and inner disk 306 such that touch points 316-318 contact a surface of a touch-sensitive system along the same plane 332.

In order for touch points 316-318 to contact the surface along plane 332, touch points 316-318 may be of different sizes or include other features to render their corresponding contact points coplanar. For instance, touch point 316 of outer disk 312 may be slightly larger than touch point 317 of intermediate disk 314. Similarly, touch point 317 may be slightly larger than touch point 318 of inner disk 306. This may occur due to the stack-up nature of the disks illustrated in FIG. 3 because bottom surface 322 of outer disk 302 is slightly farther away from plane 332 than, for instance, bottom surface 330 of inner disk 306.

Figure 4:
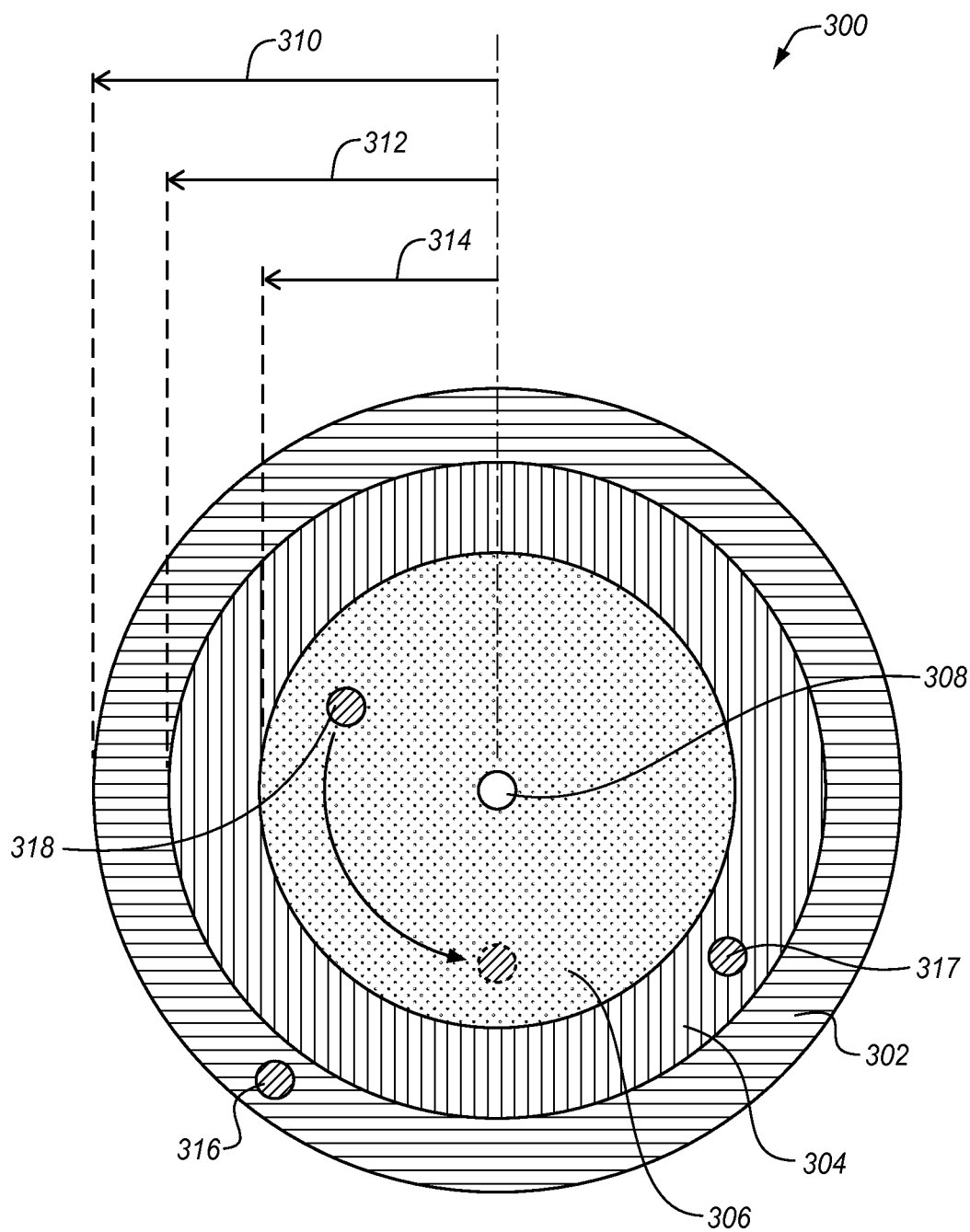
FIG. 4 illustrates a bottom view of the object of FIG. 3 in an exemplary embodiment.

Generally, the spatial relationship between touch points 316-318 may be changed as elements are rotated with respect to each other. This is more readily apparent when reviewing FIG. 4, which illustrates a bottom view of passive object 300 of FIG. 3 in an exemplary embodiment.

For instance, if inner disk 306 is rotated counter-clockwise with respect to outer disk 302 as indicated by the arrow, the configuration of touch points 316-318 changes. This allows the touch-sensitive system to identify passive object 300 differently depending the configuration of touch points 316-318. Rotating one or more of intermediate disk 304 and/or inner disk 306 may also be performed in discrete steps as a matter of design choice. For instance, inner disk 306 may have bumps or other features on top surface 328 that align with depressions in bottom surface 326 of intermediate disk 304 to allow inner disk 306 to rotate in a step-wise manner with respect to intermediate disk 304. Similar features may be present between intermediate disk 304 and outer disk 302. In other embodiments, outer disk 302 and/or intermediate disk 304 and/or inner disk 306 may include internal couplings (e.g., gears, springs, latches, notches, etc.) with each other as a matter of design choice.

Although passive object 100 and passive object 300 have been described, other active objects may be used to provide electronic identification to a touch-sensitive system. Active objects utilize a communication scheme to communicate identification information to a touch-sensitive system rather than presenting a particular configuration of touch points.

Figure 5:
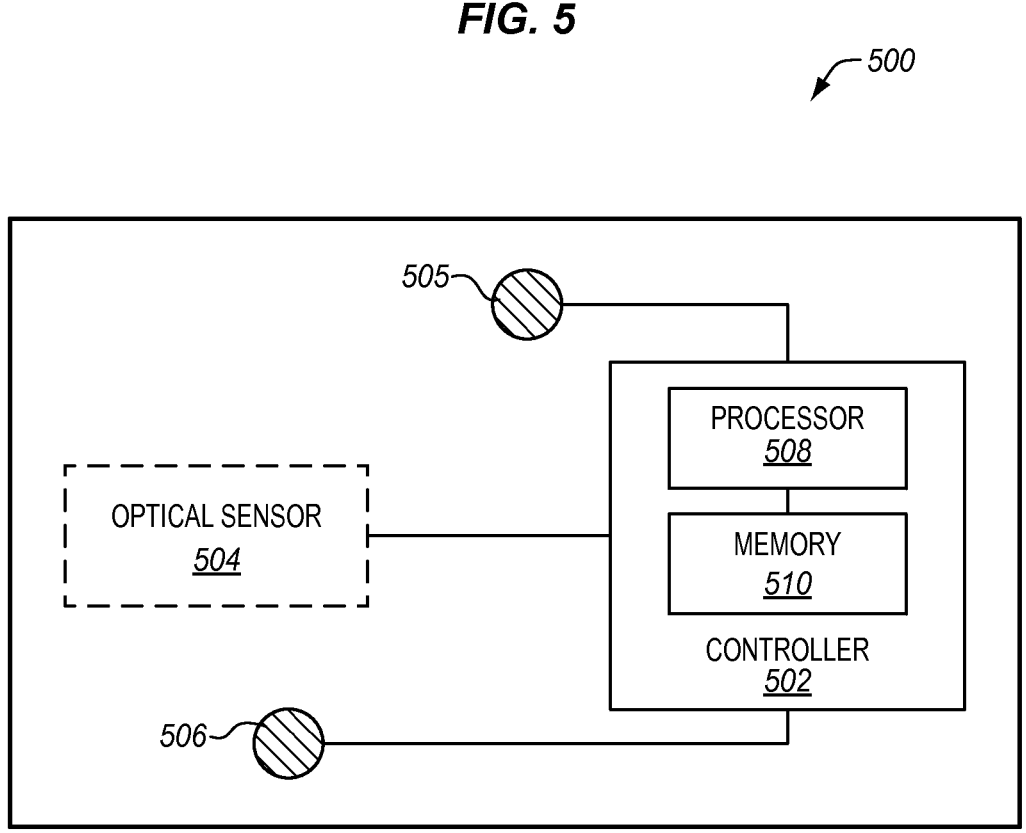
FIG. 5 is a block diagram of an active object that is capable of providing electronic identification information to a touch-sensitive system in an exemplary embodiment.

FIG. 5 is a block diagram of an active object 500 that is capable of providing electronic identification information to a touch-sensitive system in an exemplary embodiment. In this embodiment, a controller 502 communicates with a touch-sensitive system by applying electrical signals to electrically-conductive touch points 505-506 when touch points 505-506 are in contact with a surface of the touch-sensitive system. The electrical signals may include data signals, clock signals, etc., to allow controller 502 to communicate information to a touch-sensitive system. Controller 502 may include one or more processors 508 (e.g., Intel Atom, Microchip PIC, Cortex A9, etc.) that is capable of implementing the functionality described herein for controller 502. Processor 508 is coupled to memory 510 (e.g., Random Access Memory, FLASH, etc.), which may be used to store programmed instructions executable by processor 508.

By using electrical signaling to communicate with a touch-sensitive system, controller 502 is capable of utilizing a large number of unique identification codes that may be used to identify active object 500. In some embodiments, active object 500 may include an optical sensor 504 that is able to monitor light pulses generated by a display of the touch-sensitive system. Using light pulses, the touch-sensitive system is able to communicate with active object 500.

Figure 6:
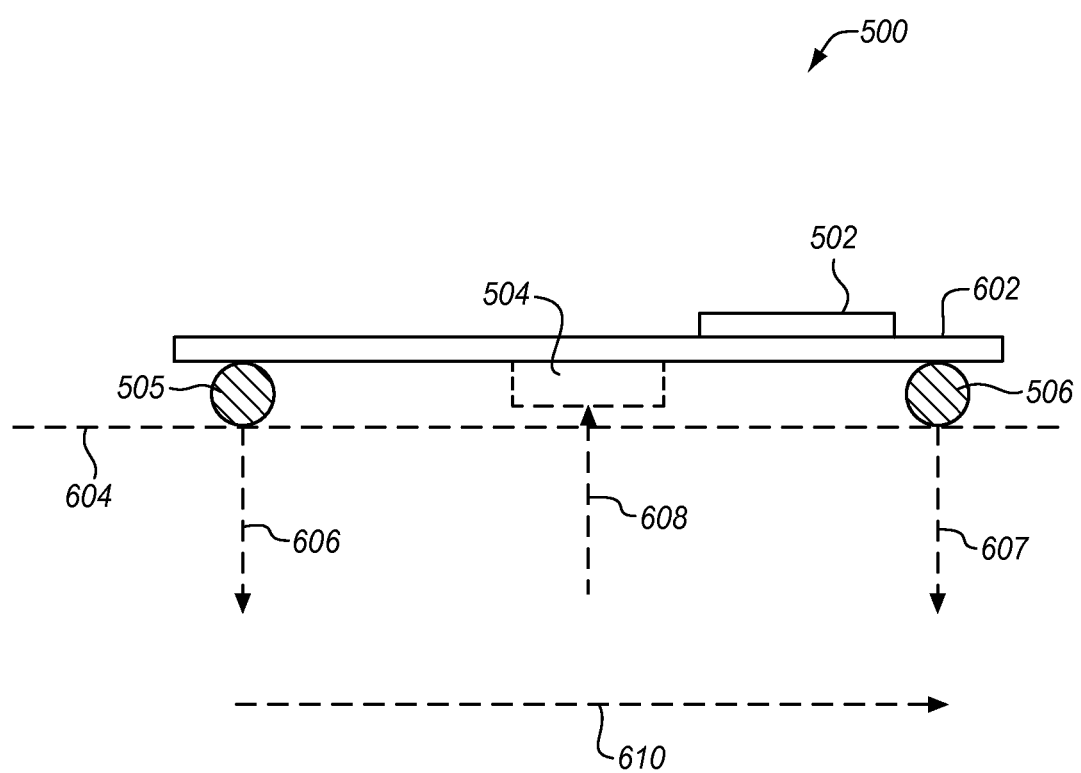
FIG. 6 illustrates a side view of the active object of FIG. 5 in an exemplary embodiment.

FIG. 6 illustrates a side view of active object 500 of FIG. 5 in an exemplary embodiment. In this view, a circuit board 602 includes optical sensor 504 facing downward towards a surface 604 of a touch-sensitive system. Sensor 504 is able to receive light pulses 608 generated by a display of the touch-sensitive system that is proximate to surface 604. Light pulses 608 encode information that may be used by controller 502. For instance, the touch-sensitive system may assign an identifier to active object 500, and use light pulses 608 to communicate the identifier to controller 502 via optical sensor 504. This identifier may be used by controller 502 during game play to identify active object 500 to the touch-sensitive system.

During operation of active object 500, controller 502 is able to communicate with the touch-sensitive system by generating electrical signals 606-607 at corresponding touch points 505-506. Signals 606-607 may include data signals, clock signals, etc., as a matter of design choice. For instance, for synchronous data communication, controller 502 may generate a clock signal 607 to synchronize a corresponding data signal 606 to the touch-sensitive system. For asynchronous data communication, controller 502 may utilize one or more of signals 606-607 to communicate with the touch-sensitive system at a pre-defined data rate. In some embodiments, the data rate may be adjusted based on the detection capability of the surface of the touch-sensitive system. In other embodiments, controller 502 may utilize signals 606-607 as separate data channels to increase the effective data communication rate between controller 502 and the touch-sensitive system.

In some embodiments, signals 606-607 are different, thereby allowing the touch-sensitive system to identify each of touch points 505-506 separately. For instance, if signal 606 is generated at a first frequency and signal 607 is generated at a second frequency, then the touch-sensitive system is able to determine a location of touch point 505 in relation to touch point 506. This may allow the touch-sensitive system to identify a vector 610 for active object 500. For instance, the first frequency signal 606 may identify a tail of vector 610 to the touch-sensitive system and the second frequency signal 607 may identify a head of vector 610 to the touch-sensitive system. Using vector 610, the touch-sensitive system is able to determine the orientation of active object 500. This may be used, for instance, during game play to determine which way a figure mounted to active object 500 is facing.

EXAMPLES

Figure 7:
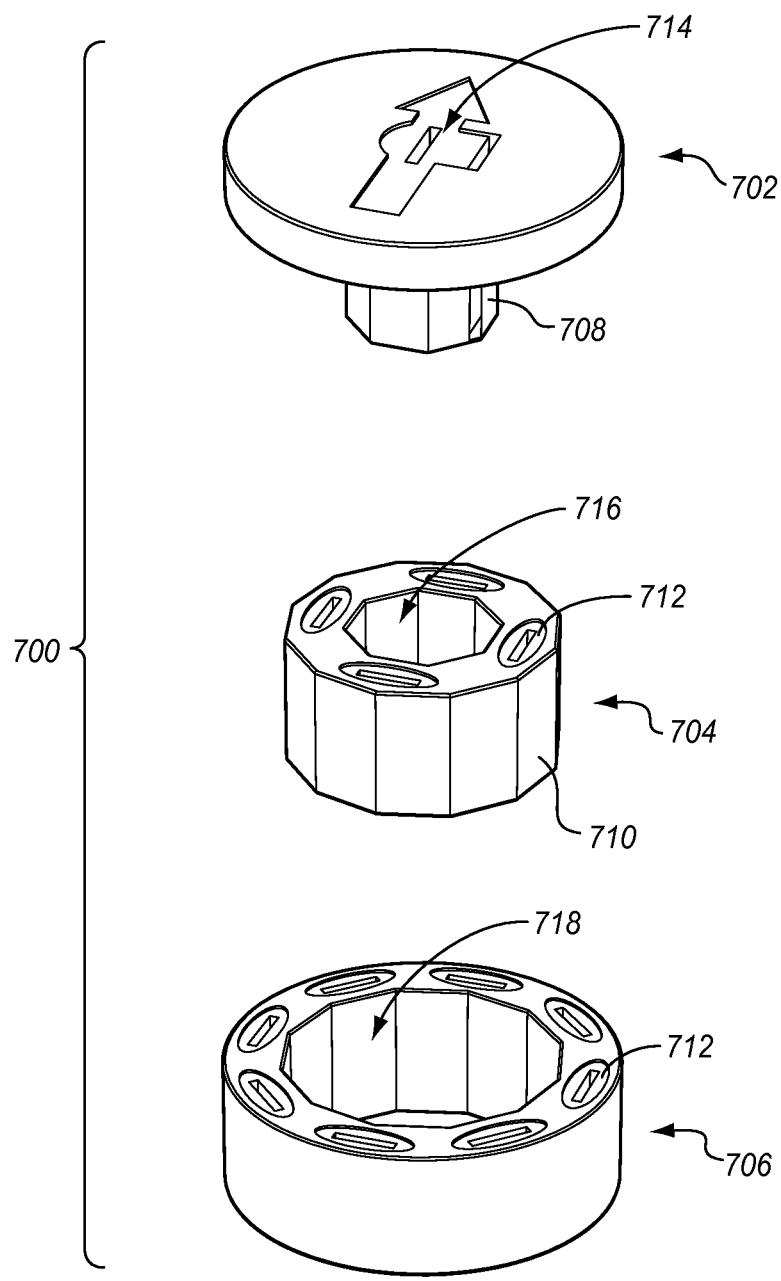
FIG. 7 illustrates a passive object that is capable of altering a configuration of touch points in contact with a surface of a touch-sensitive system in another exemplary embodiment.

FIG. 7 illustrates a passive object 700 capable of changing a configuration of touch points in contact with a surface of a touch-sensitive system in another exemplary embodiment. In this embodiment, passive object 700 includes a cap/plug assembly 702 that includes a slot 714 to accept a game figure. Cap/plug assembly 702 fits into an intermediate member 704. Intermediate member 704 fits into an outer member 706. Each of the cap/plug assembly 702, intermediate member 704, and outer member 706 include one or more touch points on their corresponding bottom surfaces that lie along the same plane when passive object 700 is fit together. This may be similar to the touch points previously described for passive object 100 of FIG. 1.

In this embodiment, a locking feature 708 on the outside surface of cap/plug assembly 702 corresponds with locking feature 716 of an opening through intermediate member 704. In this case, locking feature 708 and locking feature 716 are a series of vertical slots that hold cap/plug assembly 702 from rotating with respect to intermediate member 704 when cap/plug assembly 702 and intermediate member 704 are fit together. A similar locking feature 710 on the outside surface of intermediate member 704 corresponds with a locking feature 718 of an opening through outer member 706. In this case, locking feature 710 and locking feature 718 are also a series of vertical slots that hold intermediate member 704 from rotating with respect to outer member 706 when intermediate member 704 and outer member 706 are fit together. Once passive object 700 is fit together, a number of slots 712 on outer member 706 and intermediate member 704 mate with projections on cap/plug assembly 702 (not shown) to hold passive object 700 together. In order to change a configuration of the touch points, passive object 700 may be taken apart and re-assembled into a different configuration by rotating any of cap/plug assembly 702, intermediate member 704 and/or outer member 706 with respect to each other.

Figure 8:
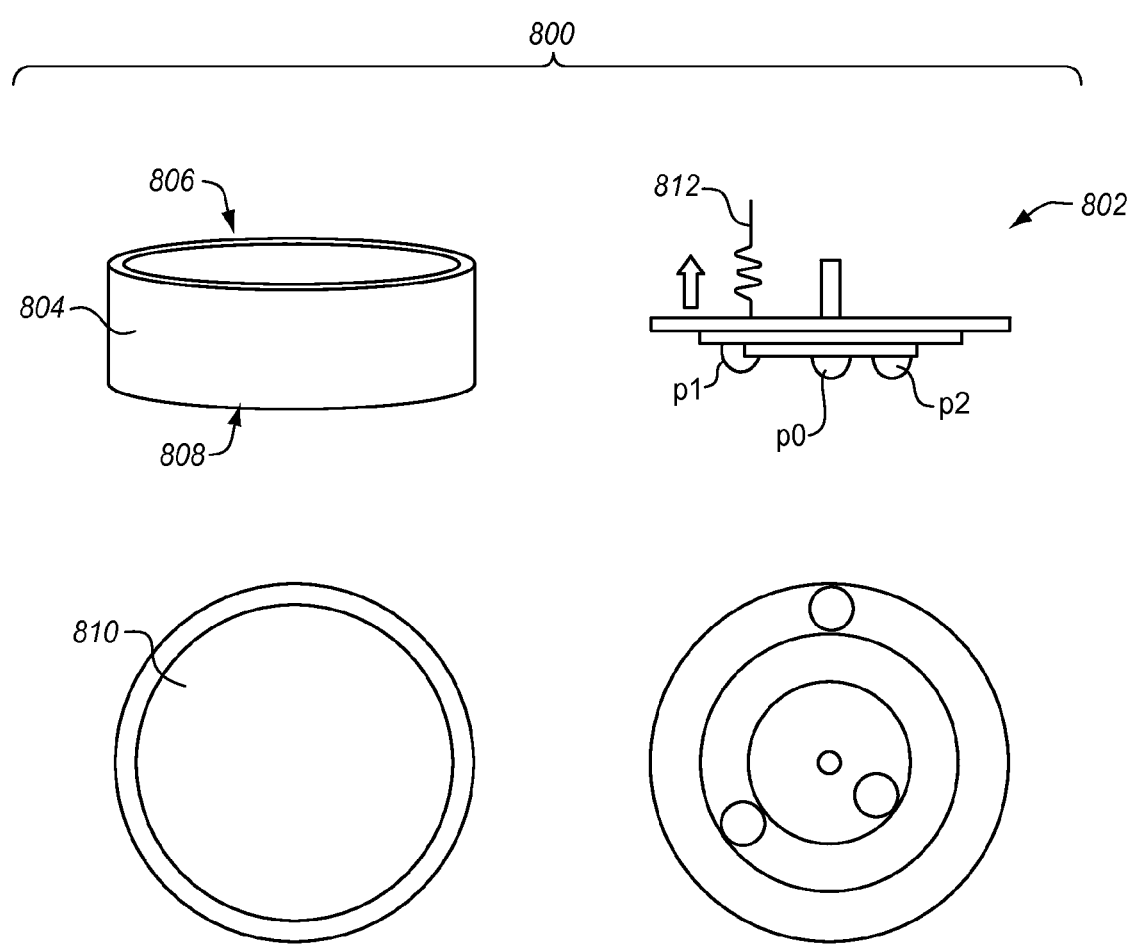
FIG. 8 illustrates a passive object that is capable of altering a configuration of touch points in contact with a surface of a touch-sensitive system in another exemplary embodiment.

FIG. 8 illustrates a passive object 800 that is capable of altering a configuration of touch points in contact with a surface of a touch-sensitive system in another exemplary embodiment. In this embodiment, passive object 800 includes a disk/spindle assembly 802 having one or more movable disks with touch points, similar to passive object 300 previously described in FIG. 3. A housing 804 may include an open top 806 and bottom 808 and is able to surround disk/spindle assembly 802. A top button 810 attaches to disk/spindle assembly 802 and is used to overcome a tensioning force provided by a spring 812 that lifts disk/spindle assembly 802 away from a surface of the touch-sensitive system unless force is applied to button 810. Bottom 808 may include a film (e.g., an electrically neutral film) that is used to hold disk/spindle assembly 802 within housing 804. When button 810 is pressed, disk/spindle assembly 802 moves downward inside of housing 804 and allows touch points P0-P3 to contact the surface.

In some embodiments, button 810 is electrically conducting and couples to touch points P0-P2. In this embodiment, spring 812 is not necessary to lift disk/spindle assembly 802 away from the surface of the touch-sensitive system. Instead, P0-P2 conduct when a user touches button 810 and are electrically inert otherwise.

Figure 9:
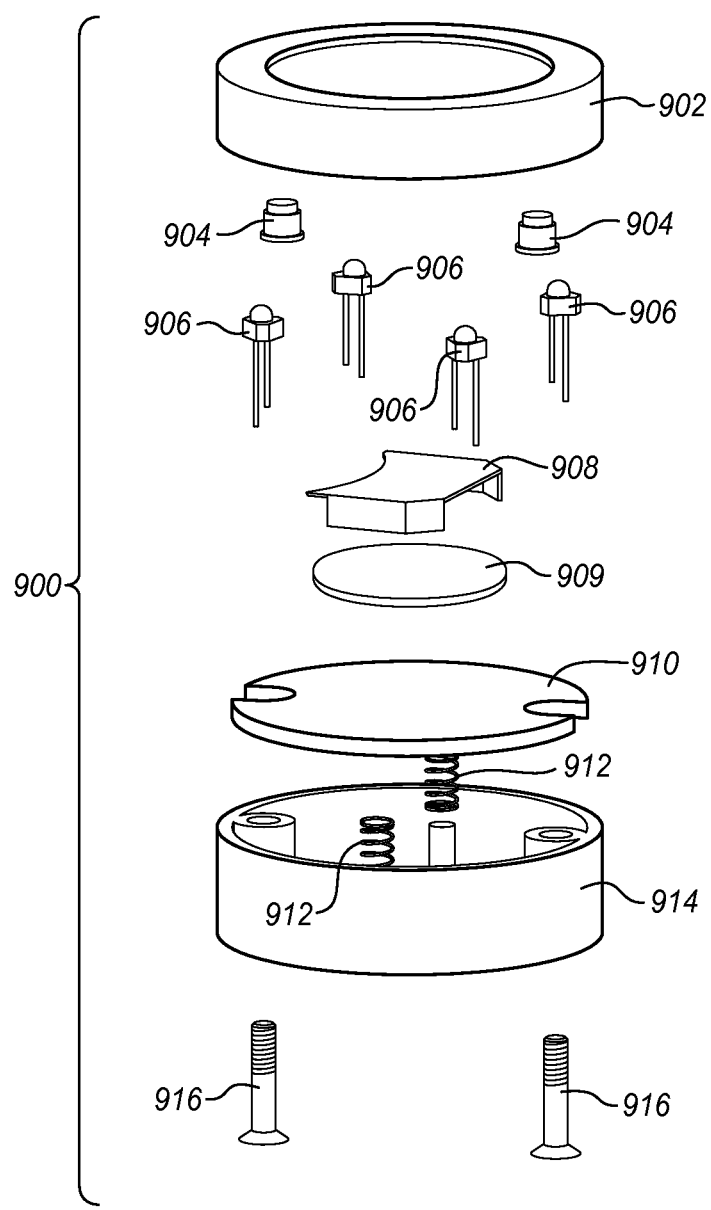
FIG. 9 illustrates an active object that is capable of providing electronic identification information to a touch-sensitive system in another exemplary embodiment.

FIG. 9 illustrates an active object 900 that is capable of providing electronic identification information to a touch-sensitive system in an exemplary embodiment. In this embodiment, active object 900 includes a top piece 902, a pair of threaded inserts 904 that fit into top piece 902, and a number of Light Emitting Diodes (LEDs) 906. LEDs 906 mount to a printed circuit board 910 and may be used to provide information to a user regarding active object 900. For instance, LEDs 906 may blink when active object 900 is transmitting data to the touch-sensitive system.

In this embodiment, active object 900 further includes a battery holder 908 that mounts to printed circuit board 910 and a battery 909 that provides power to active object 900. A pair of conductive springs 912 electrically couple printed circuit board 910 to a pair of conductive touch points (not shown) to allow electrical signaling between printed circuit board 910 and the touch points. Further, a base piece 914 accepts a pair of fasteners 916 which are used to secure the various elements illustrated in FIG. 9 together. During operation, a controller (not shown) transmits electrical signals to the touch points via conductive springs 912 to provide signaling to a surface of the touch-sensitive system.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

We claim:

1. A system comprising:
an object capable of altering a configuration of touch points in contact with a surface of a touch-sensitive system, the object comprising:
an outer member having an opening between a top surface and a bottom surface;
an intermediate member having an opening between a top surface and a bottom surface, wherein the intermediate member fits within the opening of the outer member; and
an inner member that fits within the opening of the intermediate member and has a bottom surface;
wherein the bottom surface of each of the outer member, the intermediate member, and the inner member includes a touch point;
wherein a contact point with the surface for each touch point is coplanar when the outer member, the intermediate member, and the inner member are fit together;
wherein the configuration of touch points in contact with the surface defines an identifier for the object to the touch-sensitive system;
wherein the inner member is configured to rotate with respect to the outer member to change the configuration of the touch points in contact with the surface of the touch-sensitive system.

2. The system of claim 1 wherein:
the outer member has an inner surface defined by the opening of the outer member;
the intermediate member has an exterior surface that fits within the inner surface of the outer member; and
at least one of the inner surface and the exterior surface includes a locking feature that prevents the intermediate member from rotating within the opening of the outer member when the outer member and the intermediate member are fit together.

3. The system of claim 1 wherein:
the intermediate member has an inner surface defined by the opening of the intermediate member;
the inner member has an exterior surface that fits within the inner surface of the intermediate member; and
at least one of the inner surface and the exterior surface includes a locking feature that prevents the inner member from rotating within the opening of the intermediate member when the intermediate member and the inner member are fit together.

4. The system of claim 1 wherein:
the inner member is configured to be withdrawn from the opening of the intermediate member, rotated with respect to the intermediate member, and re-inserted into the opening of the intermediate member to change the configuration of the touch points in contact with the surface of the touch-sensitive system.

5. The system of claim 1 wherein:
the intermediate member is configured to be withdrawn from the opening of the outer member, rotated with respect to the outer member, and re-inserted into the opening of the outer member to change the configuration of the touch points in contact with the surface of the touch-sensitive system.

6. The system of claim 1 wherein the inner member further includes:
a cap that includes a locking feature;
wherein the locking feature is configured to prevent the inner member from rotating within the opening of the intermediate member when the inner member and the intermediate member are fit together; and
wherein the locking feature is configured to prevent the intermediate member from rotating within the opening of the outer member when the outer member, the intermediate member, and the inner member are fit together.

7. A system comprising:
an object capable of altering a configuration of touch points in contact with a surface of a touch-sensitive system, the object comprising:
a spindle;
an outer disk fixed to an end of the spindle, wherein the outer disk has a top surface facing the spindle and a bottom surface;
an intermediate disk rotatably coupled to the end of the spindle and having a top surface and a bottom surface, wherein the top surface of the intermediate disk is proximate to the bottom surface of the outer disk, wherein a radius of the intermediate disk is less than a radius of the outer disk; and an inner disk rotatably coupled to the end of the spindle and having a top surface and a bottom surface, wherein the top surface of the inner disk is proximate to the bottom surface of the intermediate disk, wherein a radius of the inner disk is less than the radius of the intermediate disk;

wherein the bottom surface of each of the outer disk, the intermediate disk, and the inner disk includes a touch point;

wherein a contact point with the surface for each touch point is coplanar;

wherein the configuration of touch points in contact with the surface defines an identifier for the object to the touch-sensitive system;

wherein the inner disk is configured to rotate with respect to the outer disk to change the configuration of the touch points in contact with the surface of the touch-sensitive system.

8. The system of claim 7 wherein:

the inner disk is configured to rotate with respect to the outer disk by a pre-configured step size.

9. The system of claim 8 wherein the object further comprises:

a housing that includes a top surface and an open bottom surface;

wherein the housing is configured to surround the outer disk, the intermediate disk, and the inner disk; and wherein the bottom surface of the housing is proximate to the bottom surface of the outer disk, the intermediate disk, and the inner disk.

10. The system of claim 9 wherein:

the bottom surface of the housing is covered by an electrically neutral film.

11. The system of claim 9 wherein the object further comprises:

a cap configured to electrically couple to the touch points.

12. The system of claim 9 wherein the object further comprises:

a cap configured to couple to the spindle proximate to the top surface of the housing and to allow an application of a downward force on the spindle to move the bottom surface of the outer disk, the intermediate disk, and the inner disk toward the surface of the touch-sensitive system.

13. The system of claim 12 wherein the object further comprises:

a tensioning device configured to apply an upward force on at least one of the spindle, the outer disk, the intermediate disk, and the inner disk to move the bottom surface of the outer disk, the intermediate disk, and the inner disk away the surface of the touch-sensitive system.

14. The system of claim 7 wherein:

the intermediate disk is configured to rotate with respect to the outer disk to change the configuration of the touch points in contact with the surface of the touch-sensitive system.

15. The system of claim 14 wherein:

the intermediate disk is configured to rotate with respect to the outer disk by a pre-configured step size.

16. A system comprising:

an object configured to contact a surface of a touch-sensitive system, the object comprising:

a first touch point configured to contact the surface;

a second touch point configured to contact the surface, wherein the first touch point and the second touch point define a vector of orientation of the object;

an optical sensor configured to detect optical pulses from a display of the touch-sensitive system proximate to the surface; and a controller configured to receive the optical pulses, and to assign an identifier for the object based on the optical pulses;

the controller configured to generate a first electrical signal at the first touch point, and to generate a second electrical signal at the second touch point, wherein the first electrical signal and the second electrical signal allow the touch-sensitive system to identify the vector of orientation of the object;

the controller configured to transmit the identifier for the object to the touch-sensitive system utilizing at least one of the first electrical signal and the second electrical signal.

17. The system of claim 16 wherein:

the first electrical signal and the second electrical signals comprise at least one of a clock signal and a data signal.

18. The system of claim 16 wherein:

the first electrical signal identifies a tail of the vector to the touch-sensitive system; and the second electrical signal identifies a head of the vector to the touch-sensitive system.

* * * * *